US006125258A

United States Patent [19]

Umetani et al.

[11] Patent Number: 6,125,258

[45] Date of Patent: Sep. 26, 2000

[54] IMAGE FORMING APPARATUS

[75] Inventors: Yoshinobu Umetani, Yamatotakada; Hajime Horinaka, Kashiba, both of Japan

[73] Assignee: Sharp Kabushiki Kaisha, Osaka, Japan

[21] Appl. No.: 09/210,788

[22] Filed: Dec. 15, 1998

[30] Foreign Application Priority Data

Dec. 24, 1997 [JP] Japan .................................... 9-354709

[51] Int. Cl.[7] .......................... G03G 15/00; G03B 27/58; H04N 1/23

[52] U.S. Cl. ............................. 399/394; 355/47; 358/300

[58] Field of Search .............................. 358/300; 355/47; 399/394

[56] References Cited

U.S. PATENT DOCUMENTS 5,132,788 7/1992 Hirota ....................................... 358/75

5,440,382 8/1995 Suga ........................................ 355/317

FOREIGN PATENT DOCUMENTS 5-333708 12/1993 Japan .

*Primary Examiner*—Alan A. Mathews

*Assistant Examiner*—Khaled Brown

*Attorney, Agent, or Firm*—Nixon & Vanderhye P.C.

[57] ABSTRACT

An image forming apparatus is provided with a developer for developing a latent image on a photoreceptor drum into a visible image and a transfer drum having a position detector, for holding a supplied transfer material at a predetermined position and conveying the transfer material, and a transfer voltage source for supplying a transfer voltage to a conductive base of the transfer drum and output values of the transfer voltage source vary in stages when toners of a plurality of colors are transferred. In the image forming apparatus, when printing is continuously performed on a plurality of transfer materials, the timing where output values of the transfer voltage source are returned to the initial value is synchronized with the timing where the rear end of a transfer material having a maximum length capable of being printed is separated from the photoreceptor drum. As a result, the transfer material attracted by the transfer drum can be surely prevented from being jammed.

3 Claims, 4 Drawing Sheets

IMAGE FORMING APPARATUS

BACKGROUND OF THE INVENTION

1. Field of the Invention

The present invention relates to an image forming apparatus such as copiers and printers using an electrophotographic process or electrostatic recording process, and more particularly, to a color image forming apparatus capable of obtaining a full-color image or a multi-color image by transferring a plurality of visible images (also called toner images) of different colors to the same transfer material so as to be superimposed sequentially.

2. Description of the Prior Art

Conventionally, for example, an electrophotographic color image forming apparatus as disclosed in Japanese Unexamined Patent Publication JP-A 5-333708 (1993) has been widely used as a color image forming apparatus. This related art apparatus shown in FIG. 7 will be briefly described.

In the electrophotographic color image forming apparatus of FIG. 7, an electrophotographic photoreceptor drum 74 as an image carrier is uniformly charged by a primary charger 84 realized in the form of a roller or a corona charger. Then, an electrostatic latent image of a first color which is formed on the photoreceptor drum 74 through exposure 86 on the basis of an image signal of the first color from an exposure unit having a light emitting device 83 such as a laser device or a LED (light emitting diode), is developed into a real image by a developer unit 72*a* containing a developer such as a yellow (Y) developer.

Image formation by a color image forming apparatus will be described with reference to FIG. 7. First, a transfer material 71 supplied from a transfer material conveyance path is sandwiched between a transfer drum 73 and an attraction roller 85 by the attraction roller 85 which is separated from and brought into contact with the transfer drum 73. At the same time, a DC voltage as a bias for attraction and transfer of the first color is applied to a drum cylinder 73*a*, to electrostatically attract the transfer material 71 to a peripheral surface of the transfer drum 73 and hold thereon, by an electrostatic attraction force of the electric charge from the attraction roller 85 excited by the voltage application.

At this time, the amount of electric charge injected into the transfer material 71 is smaller than the amount of electric charge of the case where the electrostatic capacities of the transfer material 71 and a flexible sheet 73*b* are sufficiently charged by the same bias. This is because, since the transfer drum 73 carrying the transfer material 71 is rotating when the electric charge is injected into the transfer material 71 by the attraction roller 85, a time during which the attraction roller 85 supplying electric charge is in contact with the transfer material 71 is short, and therefore the supply of electric charge is insufficient, so that in accordance with the incomplete supply of electric charge the surface potential of the transfer material 71 which has passed the attraction roller 85 exhibits the polarity of the bias applied to the transfer drum 73. Therefore, only by setting the polarity of the bias applied to the transfer drum 73 to a polarity that facilitates the transfer of the visible image on the photoreceptor drum 74, transfer can be excellently performed by setting the bias to an appropriate value.

The transfer material 71 held on the transfer drum 73 by the electrostatic attraction force as described above is conveyed to an image transfer section 90 by the rotation of the transfer drum 73 and the visible image of the first color formed on the image carrier 74 is transferred. Then, in the case where a visible image of a second color is transferred, the above-mentioned bias value is changed to correct the surface potential of the transfer material 71 on the transfer drum 73 which surface potential has dropped because of the transfer of the visible image of the first color thereto. When visible images of third and fourth colors are transferred, such correction is also carried out similarly, and the visible images formed on the photoreceptor drum 74 are transferred to the transfer material 71 on the transfer drum 73 so as to be superimposed sequentially on one another.

The transfer material 71 which has undergone the above-described transfer process is diselectrified by a separation charger 79, so that the electrostatic attraction force acting between the transfer material 71 and the transfer drum 73 is removed. The transfer material 71 which is carried under this state is separated from the transfer drum 73 with the separation discharge restrained by a separation diselectrifying charger 80. Then, the visible image formed on the transfer material 71 is fixed by a fixing unit 76 into a permanent image. Reference numeral 82 represents a sheet diselectrifying charger. Reference numeral 88 represents a power source for attraction bias.

In such a related art apparatus, the attraction force of the transfer material 71 is obtained by the Coulomb's force depending on the electric charge on the transfer material 71 and the voltage applied to the drum cylinder 73*a* of the transfer drum 73. Therefore, when electric charge of the same polarity as that of the voltage applied to the drum cylinder 73*a* of the transfer drum 73 is supplied to the surface of the flexible sheet 73*b*, the attraction force of the transfer material 71 decreases even if the value of the voltage applied to the drum cylinder 73*a* of the transfer drum 73 remains the same. The surface of the flexible sheet 73*b* is supplied with electric charge by the contact between the surface of the flexible sheet 73*b* and the photoreceptor drum 74.

Since the electrophotographic photoreceptor drum 74 using a laser exposure system normally employs the reversal development method, the peripheral surface of the photoreceptor drum 74 is charged to the same polarity as that of the toner. Therefore, in order to transfer toner, a voltage of the opposite polarity to that of the toner is applied to the drum cylinder 73*a* of the transfer drum 73. For example, when the toner is negatively charged, the peripheral surface of the photoreceptor drum 74 is also negatively charged, and a positive voltage is applied to the transfer drum 73.

Consequently, positive electric charge moves from the photoreceptor drum 74 to the flexible sheet 73*b*. When the voltage applied to the transfer drum 73 is high, the potential difference between the photoreceptor drum 74 and the transfer drum 73 is large, so that the amount of electric charge supplied from the photoreceptor drum 74 to the flexible sheet 73*b* increases. The surface of the flexible sheet 73*b* is initialized by the sheet diselectrifying charger 82 immediately before the transfer material 71 is held on the transfer drum 73. Particularly, when a high transfer voltage is used, for example, in the case of transfer on an OHP (overhead projector) sheet, electric charge is supplied from the photoreceptor drum 74 not only to the surface of the flexible sheet 73*b* but also to the inside of the flexible sheet 73*b*.

For this reason, the related art image forming apparatus has drawbacks that the initialization of the potential of the transfer drum 73 by the sheet diselectrifying charger 82 is insufficient, and although the surface potential does not largely vary when image formation is performed only on one transfer material, the surface potential of the transfer drum 73 gradually decreases when image formation is continuously performed, so that not only excellent transfer can not be realized, but also the transfer material 71 cannot be held on the transfer drum 73.

SUMMARY OF THE INVENTION

An object of the invention is to solve the above-mentioned problem and to provide an image forming apparatus in which when printing is performed on a plurality of transfer materials, the jam occurrence rate is remarkably reduced by synchronizing the timing when the transfer voltage is returned to the initial value with the timing when the rear end of the transfer material having a maximum length for which the color image forming apparatus can perform printing is separated from the transfer drum.

The invention provides an image forming apparatus comprising a photoreceptor drum, a developer for developing a latent image formed on the photoreceptor drum into a visible image, a transfer drum having a position detector, for holding a supplied transfer material at a predetermined position and conveying the transfer material, and a transfer voltage source for supplying a transfer voltage to a conductive base of the transfer drum, output values of the transfer voltage source for transfer of toners of a plurality of colors varying in stages, wherein when printing is continuously carried out on a plurality of transfer materials, timing when output values of the transfer voltage source are returned to an initial value is synchronized with timing when a rear end of a transfer material having a maximum length capable of being printed by the color image forming apparatus is separated from the photoreceptor drum.

According to the image forming apparatus, when printing is performed on a plurality of transfer materials, the jam occurrence rate is remarkably reduced by synchronizing the timing where the transfer voltage is returned to the initial value with the timing when the rear end of the transfer material having a maximum length capable of being printed by the color image forming apparatus is separated from the transfer drum. In addition, since the transfer voltage in the case where no transfer material is present between the transfer drum and the photoreceptor drum is reduced, discharge between the transfer drum and the photoreceptor drum can be prevented.

In the invention it is preferable that the image forming apparatus further comprises a case for accommodating a transfer material, and a transfer material length detector for detecting a length of the transfer material accommodated in the transfer material accommodating case, and when printing is continuously carried out on the plurality of transfer materials, on the basis of a length detection result of the transfer materials accommodated in the case, the timing when the output values of the transfer voltage source are returned to the initial value is changed.

According to the image forming apparatus, by previously detecting the length of the transfer materials in the transfer material accommodating case, the timing where the rear ends of the transfer materials are separated from the transfer drum can be found even when transfer materials of different sizes are accommodated in the case, so that the transfer voltages can be returned to the initial value simultaneously with the separation of the transfer materials from the transfer drum. Consequently, electric charge can be prevented from being unnecessarily applied to the transfer drum even when transfer materials of different sizes are accommodated in the case, so that the attraction and transfer of transfer materials can be carried out without any problem. In addition, since the transfer voltage in a case where no transfer material is present between the transfer drum and the photoreceptor drum is lowered, discharge between the transfer drum and the photoreceptor drum can be prevented.

In the invention it is preferable that the image forming apparatus further comprises a supplier for supplying a transfer material, separated from the transfer material accommodating case, and a transfer material rear end detector for detecting a position of a rear end of the transfer material, and when printing is continuously carried out on the plurality of transfer materials, in response to timing when rear ends of the transfer materials are detected, the timing when the output values of the transfer voltage source are returned to the initial value is changed.

According to the image forming apparatus, by detecting the rear ends of the transfer materials, the timing where the rear ends of the transfer materials are separated from the transfer drum can be found even when the transfer materials accommodated in the transfer material accommodating case are different in length or even when the transfer materials are fed from the transfer material supplier separated from the transfer material accommodating case, so that the transfer voltages can be returned to the initial value simultaneously with the timing where the transfer materials are separated from the transfer drum. Consequently, unnecessary charge can be prevented from being applied to the transfer drum even when the transfer material is different in length from the previously detected one, so that the attraction and transfer of the transfer material can be performed without any problem. In addition, since the transfer voltage in a case where no transfer material is present between the transfer drum and the photoreceptor drum is lowered, discharge between the transfer drum and the photoreceptor drum can be prevented.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
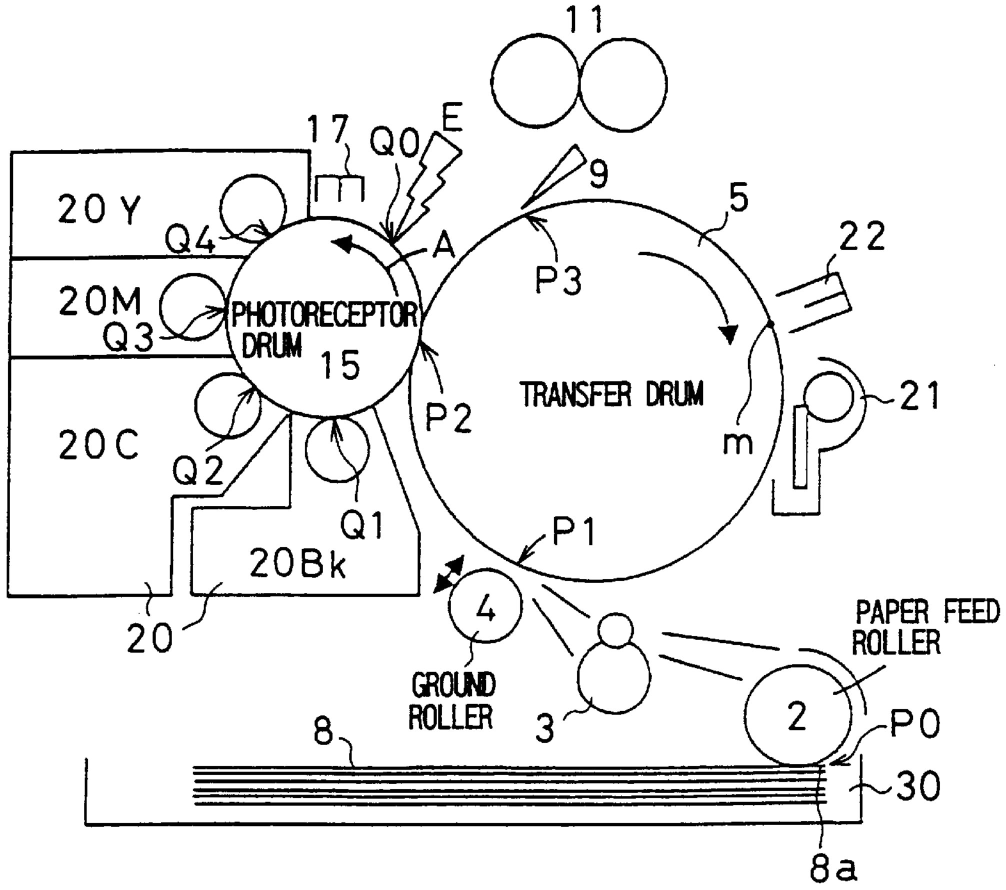
FIG. 1 is a view schematically showing the structure of a color image forming apparatus according to an embodiment of the invention.

Now referring to the drawings, preferred embodiments of the invention are described below.

(Embodiment 1)

Figure 2:
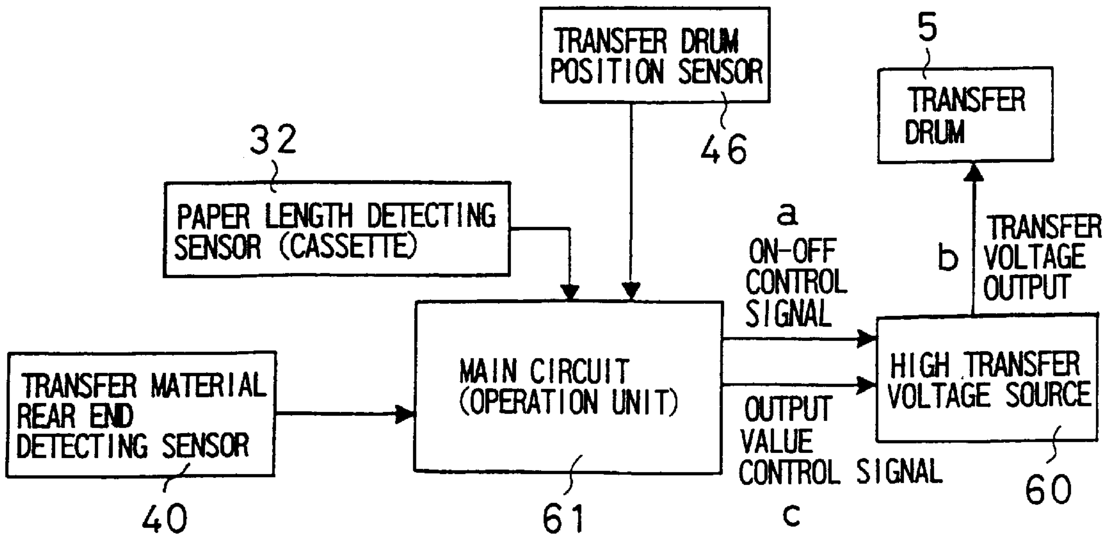
FIG. 2 is a block diagram showing the electric structure of a transfer voltage control circuit used in the color image forming apparatus of the embodiment.
Figure 3:
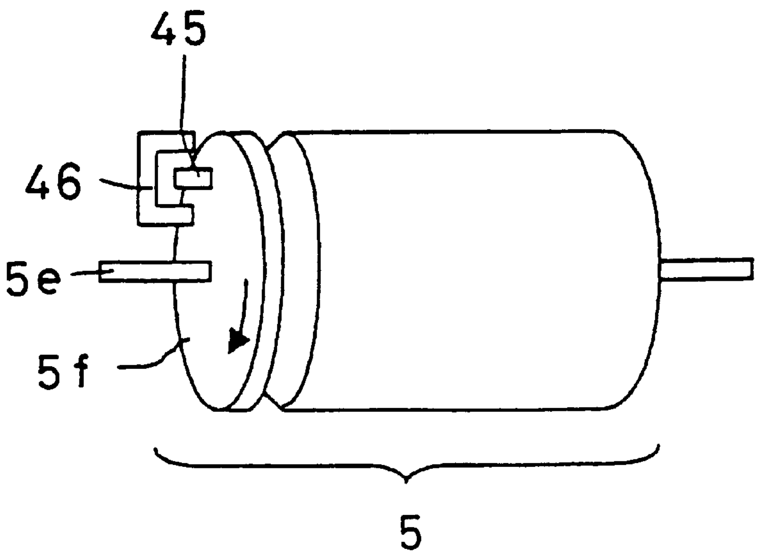
FIG. 3 is a perspective view showing a transfer drum and a transfer drum position detecting sensor 46.
Figure 4:
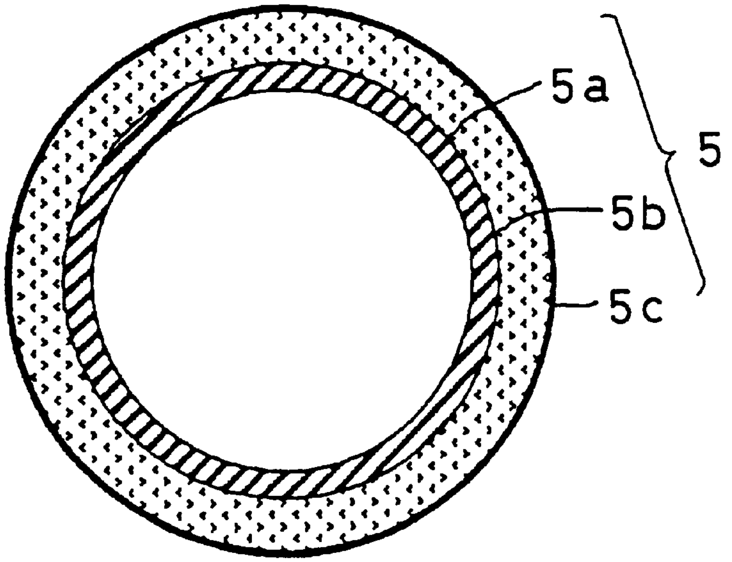
FIG. 4 is a sectional view showing the structure of the transfer drum 5 used in the embodiment.

FIG. 1 is a view schematically showing the structure of a color image forming apparatus having a transfer unit according to an embodiment of the invention. FIG. 2 is a block diagram showing the electric structure of a transfer voltage output control circuit used in the color image forming apparatus of the embodiment. FIG. 3 is a perspective view showing a structure for detecting the position of the transfer drum. FIG. 4 is a cross-sectional view showing the transfer drum provided in the transfer unit of the color image forming apparatus of FIG. 1. The image forming apparatus of this embodiment is provided in a laser beam printer.

Referring to FIG. 1, the embodiment of the invention will be described. The image forming apparatus of this embodiment has a photoreceptor drum 15 which is also called an image carrier, having a diameter of 70 mm. The image carrier 15 is rotated in the direction of an arrow A by a drive source (not shown) and a surface of the photoreceptor drum 15 is uniformly charged to −600 V by a primary charger 17. Then, the surface of the photoreceptor drum 15 is irradiated with image light E in accordance with an image signal of black color, thereby forming an electrostatic latent image on the photoreceptor drum 15. The electrostatic latent image is developed by a black color developer unit 20Bk, and black toner (two-component developer comprising carrier and toner particles adhering to the carrier by frictional electrification) is caused to adhere to the surface of the photoreceptor drum 15 in accordance with the pattern of the image, thereby forming a toner image.

In FIG. 2, as the transfer voltage output control circuit used in this embodiment, signals of a transfer drum position sensor 46 for detecting the position of a transfer drum 5, a paper length (cassette) detecting sensor 32 and a transfer material rear end detecting sensor 40 are inputted to a main circuit (operation unit) 61. An on-off control signal and an output value control signal are supplied from the main circuit 61 to a high transfer voltage source 60. The obtained transfer voltage output is applied to the transfer drum 5.

In this embodiment, as shown in FIG. 4, as the transfer drum 5 is used one in which an expanded rubber 5*b* having a thickness of 5 mm and a flexible dielectric sheet as a dielectric layer 5*c* having a thickness of 75 μm are wound around an aluminum cylinder as a drum cylinder 5*a* having a diameter of 130 mm. The dielectric layer 5*c* is composed of a dielectric flexible sheet made of PVDF (polyvinylidene difluoride) or the like. This transfer drum is merely an example and the invention is not limited thereto.

A transfer material 8 is conveyed from a transfer material accommodating case 30 by a paper feed roller 2. A position detecting protrusion 45 is provided on a gear 5*f* attached to a rotation axis 5*e* of the transfer drum 5 shown in FIG. 3. A position detecting protrusion 45 reacts every time the protrusion 45 passes the transfer drum position detecting sensor 46, thereby detecting the rotation position of the transfer drum 5. In response to a detection signal from the transfer drum position detecting sensor 46, the control circuit 61 rotates the paper feed roller 2 in a timing such that the transfer material 8 comes to a position where the transfer material 8 is to be attracted to the transfer drum 5, and causes the transfer material 8 to be attracted to the surface of the transfer drum5 by a ground roller 4. When the transfer material 8 is attracted, a DC voltage of several hundred volts to three kilovolts is applied between the ground roller 4 and the transfer drum 5. The ground roller 4 has a resistance value of approximately $10^6$ Ω·cm in order to obtain a predetermined conductivity.

The transfer material 8 attracted to the surface of the transfer drum 5 has its front end aligned so as to be synchronized with the black toner image on the photoreceptor drum 15. Then, in order that toner is transferred to the side of the transfer material 8, a voltage, +2.0 kV in this embodiment, of a polarity opposite to that of the toner is applied to the transfer material 8.

Toner not transferred remains on the surface of the photoreceptor drum 15. The residual toner is cleaned by a cleaning unit (not shown) having a rubber blade and a fur brush. The surface of the photoreceptor drum 15 is again uniformly charged by the charger 17, and a toner image of another color, for example, a cyan toner image is formed as a latent image like the black image, and thereafter the cyan toner image formed by developing the latent image into a real image by a developer unit 20*c* is transferred, with a transfer voltage of 2.2 kV, onto the transfer material 8 to which the black toner image has been transferred so as to be superimposed on the black toner image.

Likewise, a magenta toner image and a yellow toner image are successively formed on the photoreceptor drum 15 by latent image formation and development by a magenta developer unit 20M and a yellow developer unit 20Y. The magenta toner image and the yellow toner image are transferred onto the transfer material 8 so as to be superimposed sequentially with transfer voltages of 2.4 kV and 2.6 kV, respectively, so that a color image formed by superimposing the toner images of the four colors, namely, yellow, cyan, magenta and black is obtained on the transfer material 8.

After the transfer of the toner images is all completed, the transfer material 8 on the transfer drum 5 is separated from the surface of the transfer drum 5 by a separation claw 9. Then, the toner images of the four colors on the transfer material 8 is heated and fused by a fixing unit 11 and fixed as a full-color permanent image on the transfer material 8.

When printing is continuously performed on a plurality of transfer materials 8, simultaneously with the timing where the rear end of the transfer material 8 having a maximum length capable of being printed by the color image forming apparatus is separated from the surface of the transfer drum 5 by the separation claw 9, the transfer voltage is set to a first attraction transfer voltage as an initial value, of a transfer material 8 to be next printed. Then, the transfer material 8 is conveyed from the transfer material accommodating case 30 by the paper feed roller 2, and the printing sequence is repeated again.

In order to confirm the effect of the voltage switching timing in the structure of this embodiment, the following test was performed. Table 1 shows jam occurrence rates in a case where the transfer voltage is returned to the initial value immediately after the rear end of the transfer material 8 is separated and in a case where the transfer voltage is returned immediately before the second and succeeding transfer materials are attracted to the transfer drum. In this test, PVDF having a thickness of 75 μm was used as the flexible sheet 5*c*, and foamed hydrin rubber having a thickness of 5 mm whose volume resistance value is controlled to $10^8$ Ω·cm was used as a foamed rubber member 5*b*. The transfer materials used for printing were OHP sheets.

TABLE 1

| | Simultaneous with separation of rear end of transfer material | Simultaneous with attraction of front end of transfer material |
|---|---|---|
| Jam occurrence rate | 0% | 5% |

As is apparent from the results shown in Table 1, comparing the jam occurrence rate between the case where the transfer voltage is returned to the initial value simultaneously with the separation of the rear end of the transfer material 8 from the transfer drum 5 and the case in which the transfer voltage is returned simultaneously with the attraction of the second and succeeding transfer materials to the transfer drum 5, the jam occurrence rate is very high when the transfer voltage is returned to the initial value immediately before the second and succeeding transfer materials are attracted to the transfer drum 5.

(Embodiment 2)

A method will be described in which the timing where the rear end of the transfer material is separated from the transfer drum 5 is calculated from the result of detection of the length of the transfer material 8 set in the transfer material accommodating case 30 (hereinafter, sometimes referred to as cassette) and the transfer voltage is returned to the initial value based on the result of the calculation. The same parts as those of the embodiment such as the printing sequence as in example 1 will not be described.

Figure 5:
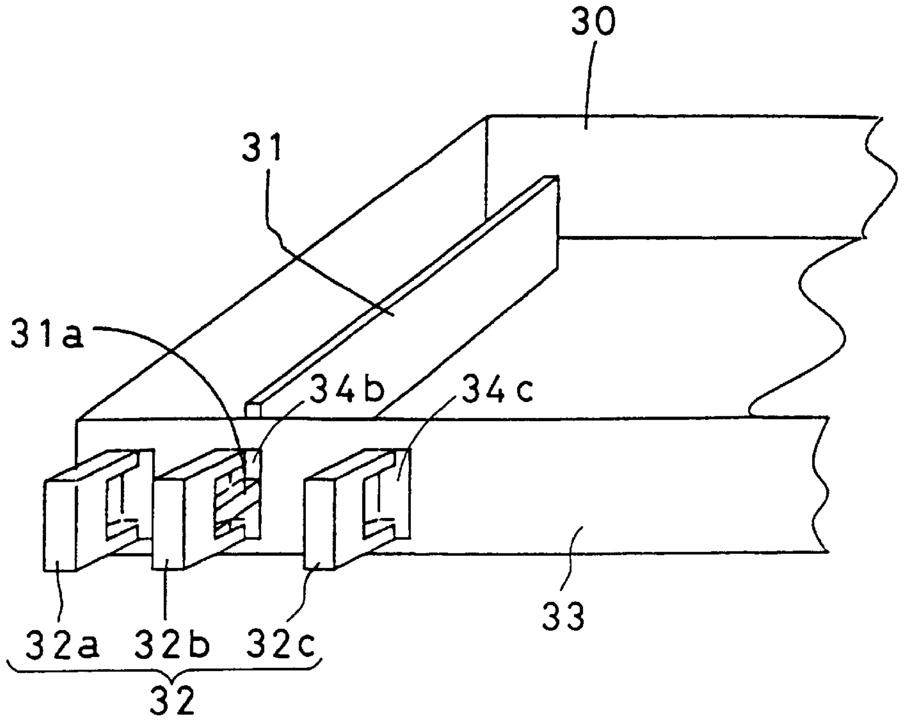
FIG. 5 is a perspective view showing a structure for detecting a length of a transfer material, provided in a transfer material accommodating case 30.

FIG. 5 showing another embodiment of the invention is a view of a structure for detecting a length of a transfer material in the transfer material accommodating case 30. A transfer material rear end restricting plate 31 in the transfer material accommodating case 30 aligns rear ends of transfer materials 8 and prevents the transfer materials 8 from moving rearward when the transfer materials 8 are fed. The transfer material rear end restricting plate 31 is formed so that a protrusion 31*a* protrudes out of one of a plurality of (three in this embodiment) through holes 34*a* to 34*c* formed in one side wall 33 of the transfer material accommodating case 30. The protrusion 31*a* causes a detector 32 for detecting the protrusion to react. The protrusion detector 32 comprises a plurality of protrusion detectors 32*a* to 32*c* (for example, photosensors) attached to the body side so as to be spaced. Since the position of the transfer material rear end restricting plate 31 changes in accordance with the length of the transfer material 8, one of the plurality of protrusion detectors 32*a* to 32*c* attached to a main body side of the apparatus is caused to react. The signal of the reacting protrusion detector 32*b* is inputted to the main circuit 61, and the paper length can be obtained by performing a calculation on the basis of data on the length of the transfer materials preset in the main circuit 61.

The transfer material 8 in the transfer material accommodating case 30 is conveyed by the paper feed roller 2. The paper feed roller 2 is rotated in such timing that the transfer material 8 comes to a position where the transfer material 8 is to be attracted to the transfer drum 5, and the transfer material 8 is attracted to the surface of the transfer drum 5 by the ground roller 4. When the transfer material 8 is attracted, a DC voltage of several hundred volts to three kilovolts is applied between the ground roller 4 and the transfer drum 5.

The transfer material 8 attracted to the surface of the transfer drum 5 has its front end aligned so as to be synchronized with the black toner image on the photoreceptor drum 15. Then, in order that toner is transferred to the side of the transfer material 8, a voltage of a polarity opposite to that of toner is applied to the transfer material 8.

Toner not transferred remains on the surface of the photoreceptor drum 15. The residual toner is cleaned by a cleaning unit (not shown). The surface of the photoreceptor drum 15 is again uniformly charged by the charger 17. Then, like the black image, a toner image of another color, for example, a cyan toner image is formed by latent image formation and development by the developer unit 20*c*, and the cyan toner image is transferred onto the transfer material to which the black toner image has been transferred so as to be superimposed on the black image. Likewise, a magenta toner image and a yellow toner image are successively formed on the photoreceptor drum 15 by latent image formation and development by the magenta developer unit 20M and the yellow developer unit 20Y. The magenta toner image and the yellow toner image are transferred onto the transfer material 8 so as to be superimposed on one another, so that a color image formed by superimposing the toner images of the four colors, namely, yellow, cyan, magenta and black is obtained on the transfer material 8.

After the transfer of the toner images is all completed, the transfer material 8 on the transfer drum 5 is separated from the surface of the transfer drum 5 by the separation claw 9. Then, the toner images of the four colors on the transfer material 8 is fused by heat by the fixing unit 11 and fixed as a full-color permanent image on the transfer material 8.

When printing is continuously performed on a plurality of transfer materials, simultaneously with the timing where the rear end of the transfer material 8 is separated from the surface of the transfer drum 5 by the separation claw 9 which timing is calculated on the basis of the length of the transfer material 8 previously obtained by causing one of the detectors 32*a* to 32*c* to react by the protrusion 31*a* of the transfer material rear end restricting plate 31, the transfer voltage is changed to the first attraction transfer voltage of the transfer material 8 on which printing is performed next. Then, the transfer material 8 is conveyed by the paper feed roller 2 from the transfer material accommodating case 30 to a predetermined position on the transfer drum 5, and the printing sequence is repeated again.

(Embodiment 3)

A method will be described in which the timing where the rear end of the transfer material 8 is separated from the transfer drum 5 is calculated from the result of detection of the transfer material rear end detecting sensor and the transfer voltage is returned to the initial value based on the result of the calculation. The same parts as those of embodiment 1 such as the printing sequence will not be described.

Figure 6:
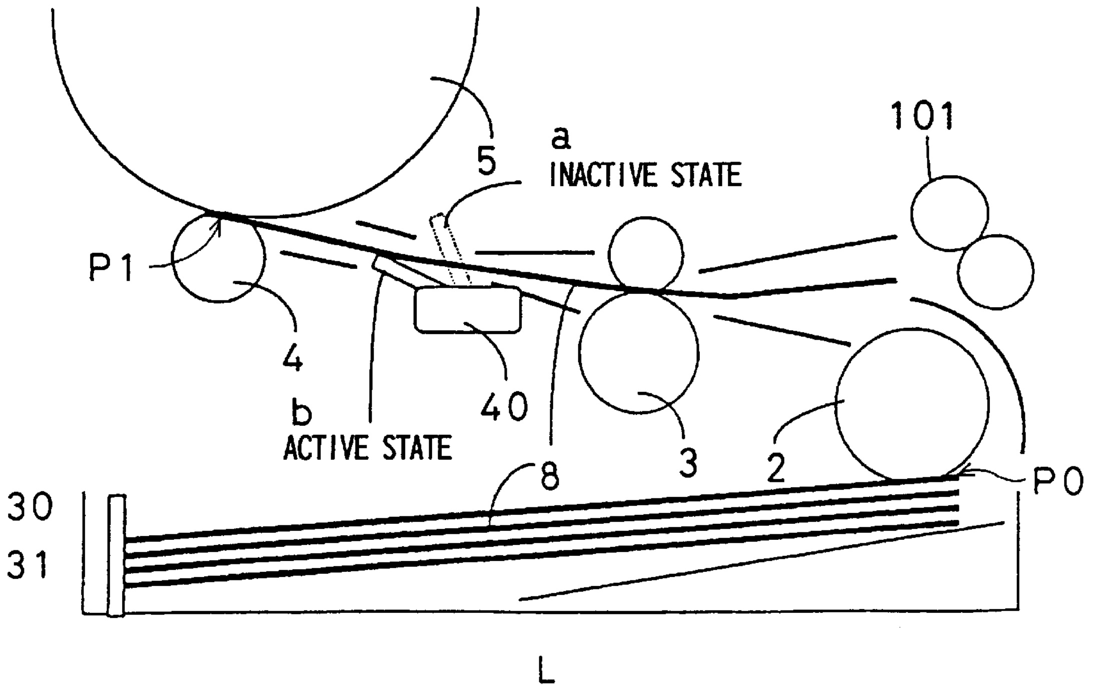
FIG. 6 is a view showing a detector for detecting a rear end of the transfer material used in the embodiment.
Figure 7:
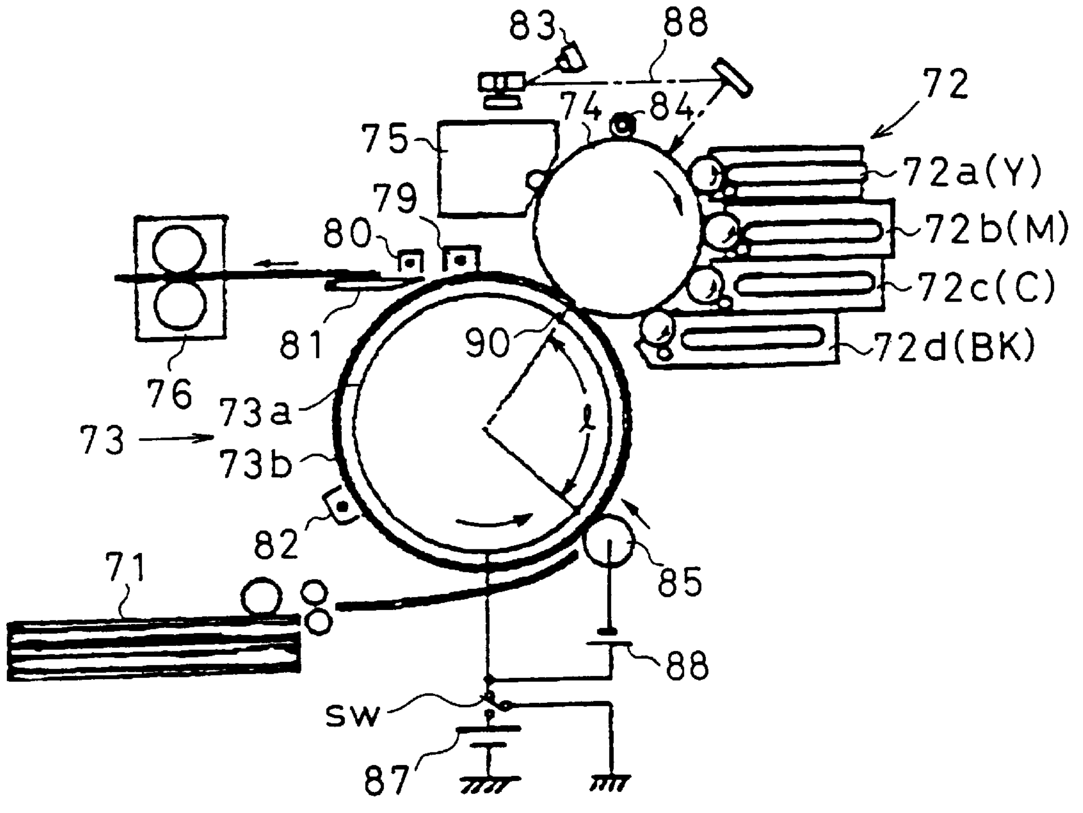
FIG. 7 is a schematic view showing a related art color image forming apparatus.

FIG. 6 showing still another embodiment of the invention is a view of a structure for detecting the rear end of the transfer material. A method of detecting the rear end of the transfer material 8 will be described. The transfer material 8 is conveyed from the transfer material accommodating case by the paper feed roller 2 in a timing such that the transfer material 8 is attracted to a predetermined position on the transfer drum. At this time, the transfer material 8 causes the transfer material rear end detecting sensor 40 to react. When the transfer material 8 is further conveyed, the rear end of the transfer material 8 passes the transfer material rear end detecting sensor 40, so that the sensor stops reacting. By detecting by the main circuit 61 a switching timing where the state of the sensor is changed from the reacting state to the non-reacting state, the position to which the rear end of the transfer material 8 attracted to the transfer drum 5 is currently attracted can be found from the switching timing.

The transfer material 8 is conveyed by the transfer material accommodating case 30 and the paper feed roller 2, or by a bypass paper feed roller 101 from a bypass outlet which is a paperfeeder other than the cassette. The paper feed roller 2 is rotated in a timing such that the transfer material 8 comes to a position where the transfer material 8 is attracted to the transfer drum 5, and the transfer material 8 is attracted onto the transfer drum 5 by the ground roller 4. When the transfer material 8 is attracted, a DC voltage of several hundred volts to three kilovolts is applied between the ground roller 4 and the transfer drum 5.

The transfer material 8 attracted to the surface of the transfer drum 5 has its front end aligned so as to be synchronized with the black toner image on the photoreceptor drum 15. Then, in order that toner is transferred to the side of the transfer material 8, a voltage of a polarity opposite to that of toner is applied to the transfer material 8.

Toner not transferred remains on the surface of the photoreceptor drum 15. The residual toner is cleaned by a cleaning unit (not shown). The surface of the photoreceptor drum 15 is again uniformly charged by the charger 17. Then, like the black image, a toner image of another color, for example, a cyan toner image is formed by latent image formation and development by the developer unit 20*c*, and the cyan toner image is transferred onto the transfer material to which the black toner image has been transferred so as to be superimposed on the black toner image. Likewise, a magenta toner image and a yellow toner image are successively formed on the photoreceptor drum 15 by latent image formation and development by the magenta developer unit 20M and the yellow developer unit 20Y. The magenta toner image and the yellow toner image are transferred onto the transfer material 8 so as to be superimposed on one another, so that a color image formed by superimposing the toner images of the four colors, namely, yellow, cyan, magenta and black is obtained on the transfer material 8.

After the transfer of the toner images is all completed, the transfer material 8 on the transfer drum 5 is separated from the surface of the transfer drum 5 by the separation claw 9. Then, the toner images of the four colors on the transfer material 8 is fused by heat by the fixing unit 11 and fixed as a full-color permanent image on the transfer material 8.

When printing is continuously performed on a plurality of transfer materials, simultaneously with the timing where the rear end of the transfer material 8 is separated from the surface of the transfer drum 5 by the separation claw 9 which timing is previously obtained by use of the transfer material rear end detecting sensor 40, the transfer voltage is changed to the first attraction transfer voltage of the transfer material 8 on which printing is performed next. Then, the transfer material 8 is conveyed by the paper feed roller 2 from the transfer material accommodating case 30 to a predetermined position on the transfer drum 5, and the printing sequence is repeated again.

It is to be understood that the invention is not limited to the embodiments described above and illustrated in the drawings and that modifications are possible without departing from the gist of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus for continuously printing on a plurality of transfer materials comprising:

a photoreceptor drum;

a developer for developing a latent image formed on the photoreceptor drum into a visible image;

a transfer drum having a position detector, for holding a supplied transfer material at a predetermined position and conveying the transfer material; and a transfer voltage source for supplying a transfer voltage to a conductive base of the transfer drum, output values of the transfer voltage source being used for transfer of toners of a plurality of colors varying in stages;

a transfer voltage source controller for returning the transfer voltage to an initial value when a rear end of a transfer material having a maximum length capable of being printed by the image forming apparatus would be separated from the photoreceptor drum if the maximum length transfer material was used in the image forming apparatus.

2. An image forming apparatus for continuously printing on a plurality of transfer materials comprising:

a photoreceptor drum;

a developer for developing a latent image formed on the photoreceptor drum into a visible image;

a transfer drum having a position detector, for holding a supplied transfer material at a predetermined position and conveying the transfer material;

a transfer voltage source for supplying a transfer voltage to a conductive base of the transfer drum, output values of the transfer voltage source being used for transfer of toners of a plurality of colors varying in stages;

a case for accommodating the transfer material;

a transfer material length detector for detecting a length of the transfer material accommodated in the transfer material accommodating case; and a transfer voltage source controller for controlling the transfer voltage such that the transfer voltage is returned to an initial value based on the length of the transfer material detected by said transfer material length detector.

3. An image forming apparatus for continuously printing on a plurality of transfer materials comprising:

a photoreceptor drum;

a developer for developing a latent image formed on the photoreceptor drum into a visible image;

a transfer drum having a position detector, for holding a supplied transfer material at a predetermined position and conveying the transfer material;

a transfer voltage source for supplying a transfer voltage to a conductive base of the transfer drum, output values of the transfer voltage source being used for transfer of toners of a plurality of colors varying in stages;

a supplier for supplying the transfer material;

a transfer material rear end detector for detecting a position of a rear end of the transfer material; and a transfer voltage source controller for controlling the transfer voltage such that the transfer voltage is returned to an initial value in response to detection of a rear end of said transfer material by said transfer material rear end detector.

* * * * *